United States Patent
Khayrallah et al.

(10) Patent No.: US 7,142,581 B2
(45) Date of Patent: Nov. 28, 2006

(54) METHODS AND SYSTEMS FOR SELECTIVE FREQUENCY HOPPING IN MULTIPLE MODE COMMUNICATION SYSTEMS

(75) Inventors: Ali S. Khayrallah, Apex, NC (US); Gregory E. Bottomley, Cary, NC (US)

(73) Assignee: Ericsson Inc., Plano, TX (US)

( * ) Notice: Subject to any disclaimer, the term of this patent is extended or adjusted under 35 U.S.C. 154(b) by 997 days.

(21) Appl. No.: 09/800,143

(22) Filed: Mar. 6, 2001

(65) Prior Publication Data
US 2002/0126736 A1    Sep. 12, 2002

(51) Int. Cl.
H04B 15/00    (2006.01)
(52) U.S. Cl. .................................... 375/133
(58) Field of Classification Search ............... 375/130, 375/131, 132, 133, 135, 136, 138
See application file for complete search history.

(56) References Cited

U.S. PATENT DOCUMENTS

| | | | | |
|---|---|---|---|---|
| 5,541,954 | A | 7/1996 | Emi | 375/202 |
| 5,790,536 | A * | 8/1998 | Mahany et al. | 370/338 |
| 6,047,018 | A * | 4/2000 | Emi | 375/135 |
| 6,118,805 | A | 9/2000 | Bergstrom et al. | 375/132 |
| 6,223,053 | B1 | 4/2001 | Friedmann et al. | 455/552.1 |
| 6,501,785 | B1 * | 12/2002 | Chang et al. | 375/133 |
| 6,839,325 | B1 * | 1/2005 | Schmidl et al. | 370/242 |
| 2002/0003792 | A1 * | 1/2002 | Schmidl et al. | 370/343 |
| 2002/0012337 | A1 * | 1/2002 | Schmidl et al. | 370/349 |
| 2002/0065625 | A1 * | 5/2002 | Xydis | 702/127 |
| 2003/0206561 | A1 * | 11/2003 | Schmidl et al. | 370/522 |
| 2005/0036467 | A1 * | 2/2005 | Kubler et al. | 370/338 |

FOREIGN PATENT DOCUMENTS

JP    08139641    5/1996

OTHER PUBLICATIONS

Knopp et al., "On Coding for Block Fading Channels," IEEE Transactions on Information Theory, vol. 46., No. 1, Jan. 2000.
Starobinski et al., *Stochastically Bounded Burstiness for Communication Networks*, IEEE Information Theory, vol. 46, No. 1, Jan. 2000.
International Search Report for PCT/US02/03438.

* cited by examiner

*Primary Examiner*—Jean B. Corrielus

(57) ABSTRACT

Methods and systems for selecting a frequency hopping mode for a communication in a communication system having a plurality of transmission schemes are provided. One of the plurality of transmission schemes to be used for the communication is determined. One of a plurality of candidate frequency hopping modes is selected as the frequency hopping mode for the communication based on the determined transmission scheme for the communication. Methods and systems for transmitting a communication packet in a communication system having a plurality of transmission schemes are also provided.

38 Claims, 6 Drawing Sheets

METHODS AND SYSTEMS FOR SELECTIVE FREQUENCY HOPPING IN MULTIPLE MODE COMMUNICATION SYSTEMS

BACKGROUND OF THE INVENTION

The present invention relates to signal communications and, in particular, to frequency hopping based signal communications.

One type of communications channel for which usage is expanding particularly rapidly is wireless communications, particularly as more radio spectrum becomes available for commercial use and as cellular phones become more commonplace. In addition, analog wireless communications are gradually being supplemented and even replaced by digital communications. In digital voice communications, speech is typically represented by a series of bits which may be modulated and transmitted from a base station of a cellular communications network to a mobile terminal device such as a cellular phone. The phone may demodulate the received waveform to recover the bits, which are then converted back into speech. In addition to a growing demand for voice communications, there is also a growing demand for data services, such as e-mail and Internet access, which typically utilize digital communications.

There are many types of digital communications systems. Traditionally, frequency-division-multiple-access (FDMA) is used to divide the spectrum up into a plurality of radio channels corresponding to different carrier frequencies. In time division multiple access (TDMA) systems, carriers may be divided into time slots, as is done, for example, in the digital advanced mobile phone service (D-AMPS) and the global system for mobile communication (GSM) standard digital cellular systems. Alternatively, multiple users can use a common range of frequencies using spread-spectrum techniques as is typically done in code-division multiple-access (CDMA).

A typical digital communications system 19 is shown in FIG. 1. Digital symbols are provided to the transmitter 20, which maps the symbols into a representation appropriate for the transmission medium or channel (e.g. radio channel) and couples the signal to the transmission medium via antenna 22. The transmitted signal passes through the channel 24 and is received at the antenna 26. The received signal is passed to the receiver 28. The receiver 28 includes a radio processor 30, a baseband signal processor 32, and a post processing unit 34.

The radio processor 30 typically tunes to the desired band and desired carrier frequency, then amplifies, mixes, and filters the signal to a baseband. At some point the signal may be sampled and quantized, ultimately providing a sequence of baseband received samples. As the original radio signal generally has in-phase (I) and quadrature (Q) components, the baseband samples typically have I and Q components, giving rise to complex, baseband samples.

The baseband processor 32 may be used to detect the digital symbols that were transmitted. It may produce soft information as well, which gives information regarding the likelihood of the detected symbol values. The post processing unit 34 typically performs functions that depend on the particular communications application. For example, it may convert digital symbols into speech using a speech decoder.

A typical transmitter is shown in FIG. 2. Information bits, which may represent speech, images, video, text, or other content material, are provided to forward-error-correction (FEC) encoder 40, which encodes some or all of the information bits using, for example, a convolutional encoder. The FEC encoder 40 produces coded bits, which are provided to an interleaver 42, which reorders the bits to provide interleaved bits. These interleaved bits are provided to a modulator 44, which applies an appropriate modulation for transmission. The interleaver 42 may perform any of a number of types of interleaving.

The modulator 44 may apply any of a variety of modulations. Higher-order modulations are frequently utilized. One example is 8-PSK (eight phase shift keying), in which 3 bits are sent using one of 8 constellation points in the in-phase (I )/quadrature (Q) (or complex) plane. Another example is 16-QAM (sixteen quadrature amplitude modulation), in which 4 bits are sent at the same time. Higher-order modulation may be used with conventional, narrowband transmission as well as with spread-spectrum transmission. The Enhanced Data Rates for Global Evolution (EDGE) standard generally uses Gray mapping from triplets to 8-PSK symbols. As a further example, the Global System for Mobile communications (GSM) typically uses non-linear modulation which can be approximated by a binary linear modulator with a heavy partial response.

It is also known to provide a communication system using a plurality of selectable transmission schemes. For example, the EDGE standard provides for 2 modulation schemes, GMSK and 8-PSK, and a family of punctured convolutional codes of various rates. A normal data packet under this standard typically occupies 4 bursts from 4 consecutive frames. A choice of modulation and coding determines the payload of a packet. For example, low rate coding and GMSK typically produce a small payload and can operate at a low Signal to Noise Ratio (SNR). High rate coding and 8-PSK typically produce a large payload and can operate at a high SNR. The typical measure of quality used in the context of data is packet error rate, or frame error rate (FER). That is, a packet may be considered in error if one or more information bits from the payload is in error.

A further known approach to improving communication quality is frequency hopping, which may be viewed as a form of diversity transmission/reception. For example, the EDGE standard typically supports burst by burst frequency hopping, so that a data packet may effectively experience four independent fades. Thus, frequency hopping may provide for lower error rates in communications.

SUMMARY OF THE INVENTION

In embodiments of the present invention, methods and systems for selecting a frequency hopping mode for a communication in a communication system having a plurality of transmission schemes are provided. One of the plurality of transmission schemes to be used for the communication is determined. One of a plurality of candidate frequency hopping modes is selected as the frequency hopping mode for the communication based on the determined transmission scheme for the communication. Methods and systems for transmitting a communication packet in a communication system having a plurality of transmission schemes are also provided.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 1:
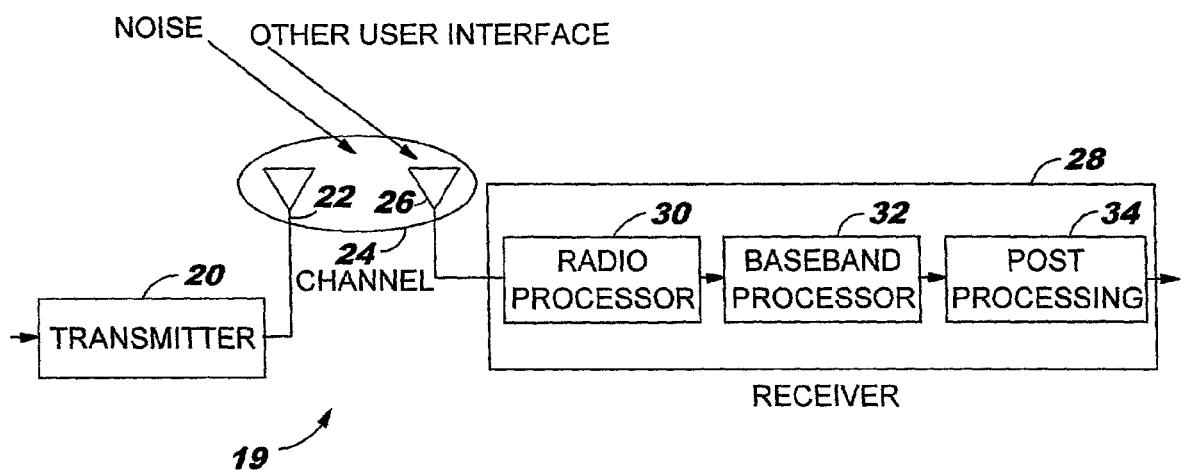
FIG. 1 is a block diagram illustrating a conventional communication system.
Figure 2:
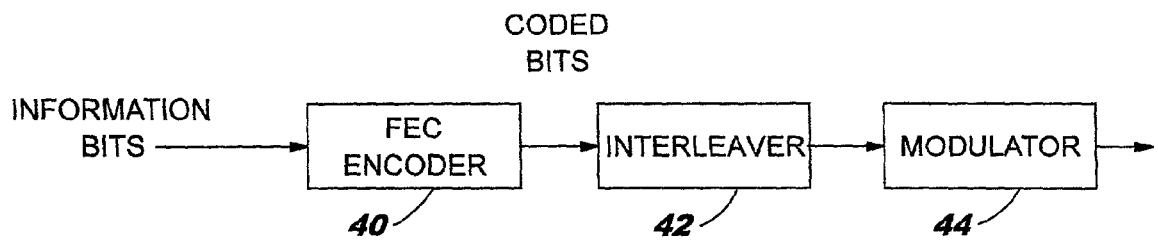
FIG. 2 is a block diagram illustrating a conventional transmitter.
Figure 3:
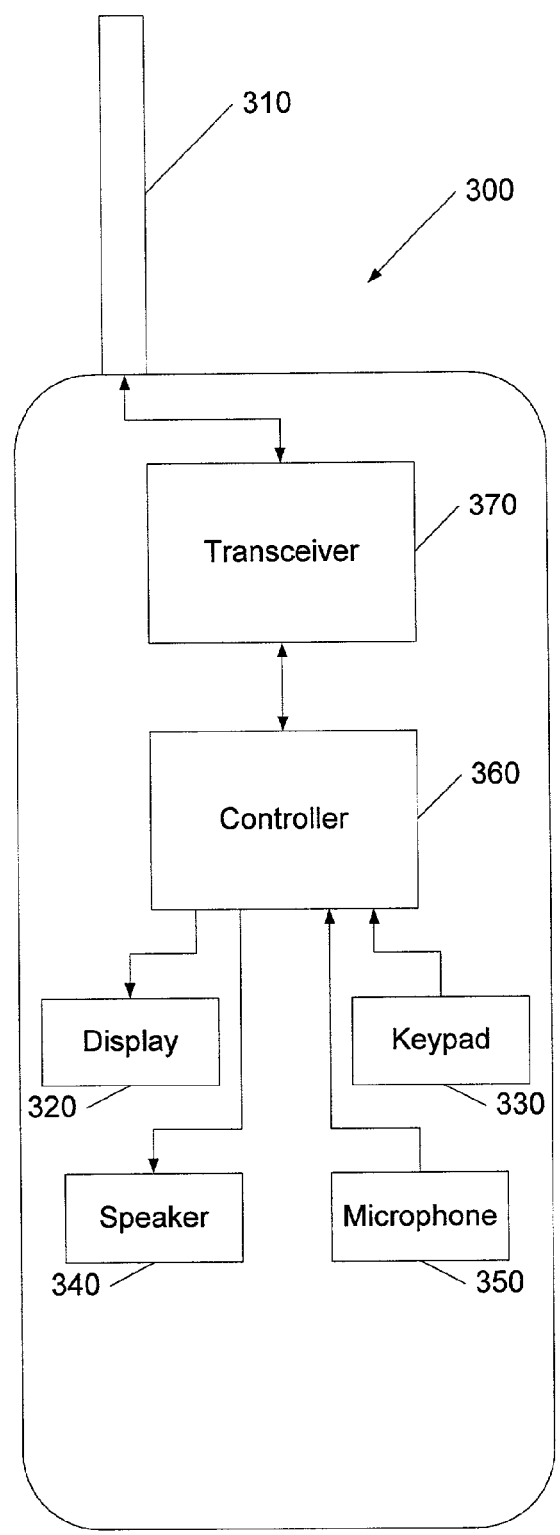
FIG. 3 is a block diagram illustrating mobile terminal including selective frequency hopping according to embodiments of the present invention.

FIG. 3 illustrates a mobile or wireless terminal 300 in which systems and methods according to the present invention may be embodied. The terminal 300 includes an antenna 310 for receiving radio frequency (RF) signals. The terminal 300 provides a user interface including a display 320 for displaying information such as dialed numbers, short messages, directory listings and the like, and a keypad 330 for entering dialed numbers and accepting other user inputs for controlling the terminal 300. The user interface also includes a speaker 340 for producing audio signals and a microphone 350 for receiving voice information from a user. The terminal 300 also includes a controller 360 that controls and/or monitors the display 320, the keypad 330, the speaker 340, the microphone 350 and a radio transceiver 370 tied to the antenna 310. The controller 360 may include, for example, a microprocessor, microcontroller or other data processing device that is operative to load and execute computer instructions for performing functions relative to selective frequency hopping as will be described herein.

Figure 4:
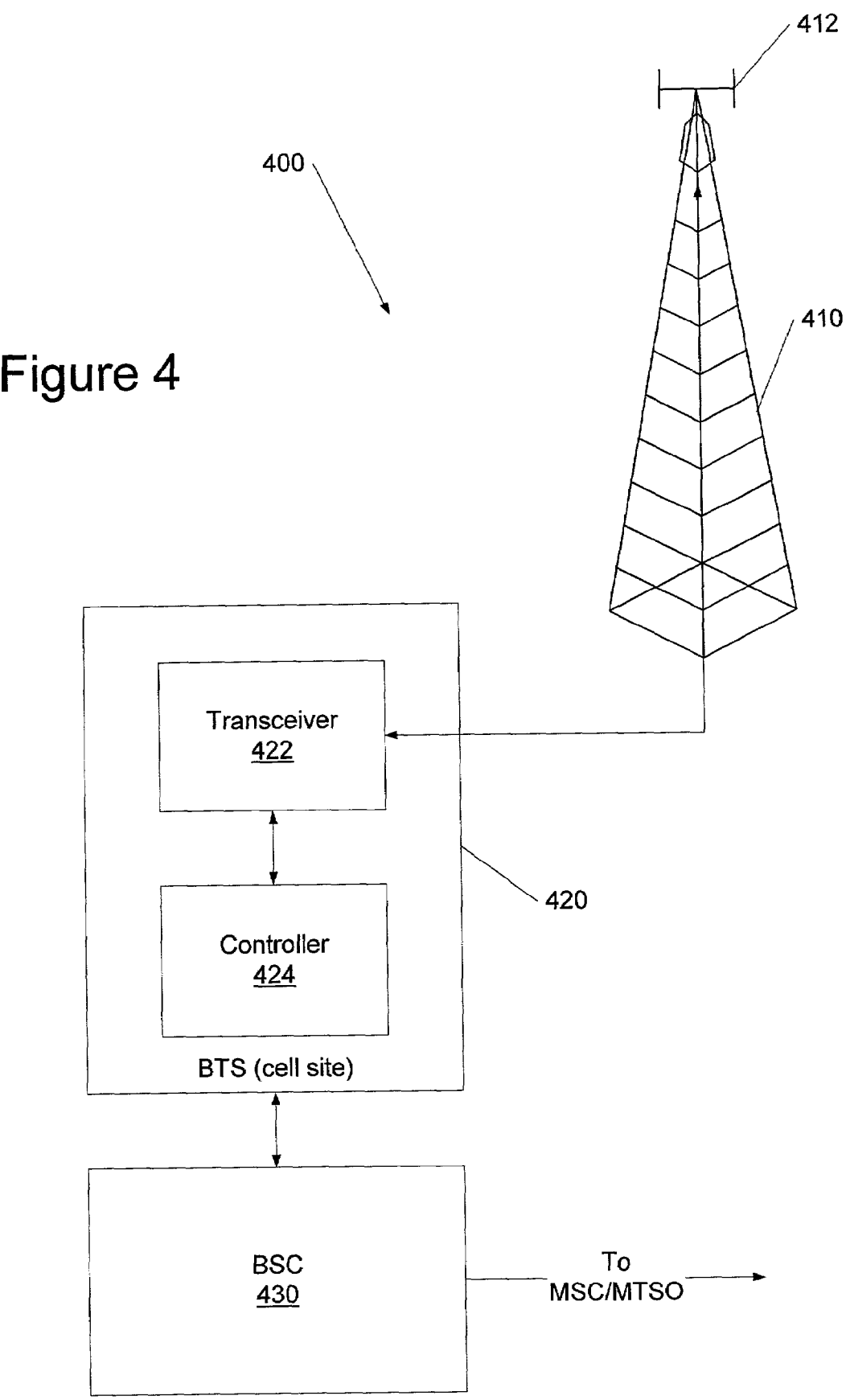
FIG. 4 is a block diagram illustrating a base station system including selective frequency hopping according to embodiments of the present invention.

FIG. 4 illustrates a base station system 400 of an exemplary wireless communications infrastructure including selective frequency hopping in accordance with embodiments of the present invention. A base transceiver station (BTS) 420 is operatively associated with one or more antennas 412 on a cellular base station tower 410. The BTS 420 includes one or more radio transceivers 422 that are operative to transmit and receive communications signals via the antenna 412 under the control of a controller 424, which may comprise, for example, a microprocessor, microcontroller, computer or other data processing apparatus. The BTS 420 is also operatively associated with a base station controller (BSC) 430 that controls radio and other operations of the BTS 420 and, perhaps, additional BTSs (not shown). As will be described below, components of the infrastructure 400 may be used for transmission and reception of communications signals, as well as for selective frequency hopping as will be described herein and may, thus, communicate with devices such as the terminal 300 of FIG. 3.

Figure 5:
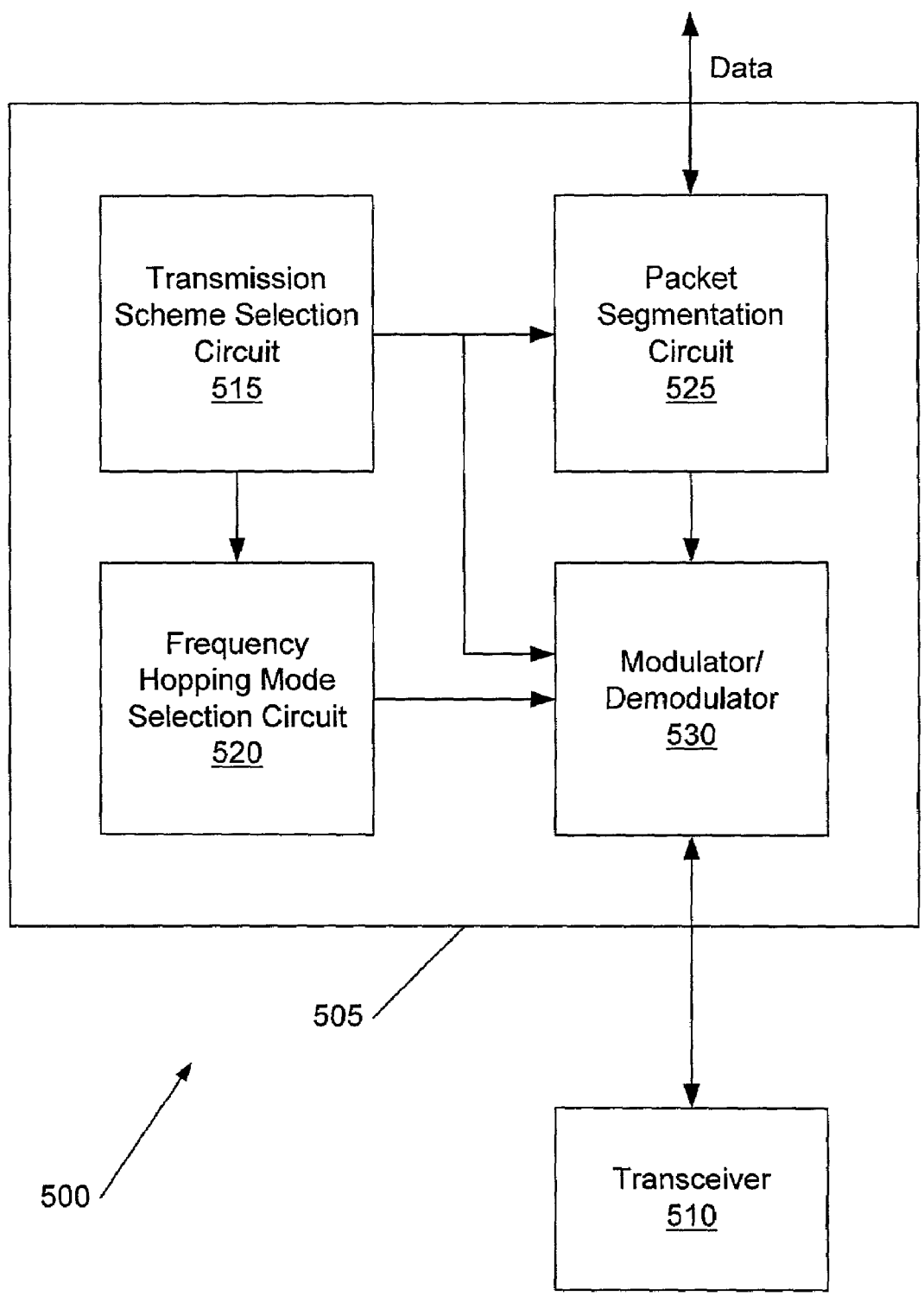
FIG. 5 is a block diagram illustrating a system including selective frequency hopping according to embodiments of the present invention.

Referring now to FIG. 5, aspects of a mobile terminal such as that illustrated in FIG. 3 or a base station system such as that illustrated in FIG. 4 related to selective frequency hopping according to embodiments of the present invention will now be further described. As shown in the block diagram of FIG. 5, a system 500 for transmitting a communication packet via a communication system using selective frequency hopping includes a controller circuit 505 coupled to a transceiver 510. While not shown in FIG. 5, as with reference to FIGS. 3 and 4, it is to be understood that the transceiver 510 may be coupled to an antenna to receive and/or transmit communication packets using selective frequency hopping. As shown for the embodiments of FIG. 5, the controller circuit 505 includes a transmission scheme selection circuit 515 that assigns ones of a plurality of transmission schemes used by the communication system to a communication packet for transmission. The assigned transmission scheme may have an associated coding rate and/or modulation scheme such as is provided with the EDGE standard. As used herein, "transmission scheme" refers to communication operations, such as coding/decoding, modulation/demodulation and other frequency hopping sensitive communication operations. A frequency hopping mode selection circuit 520 is also provided that selects one of a plurality of candidate frequency hopping modes as the frequency hopping mode for the communication packet. The selection is based on the assigned transmission scheme responsive to the transmission scheme selection circuit 515. Each of the plurality of candidate frequency hopping modes has an associated number of transmission frequencies to be used in frequency hopping. For example, one of the candidate frequency hopping modes has one as the associated number of transmission frequencies to thereby provide no frequency hopping for transmission of the packet.

A packet segmentation circuit 525 associates portions of the communication packet with different transmission windows, such as bursts, of a channel of the communication system. Thus, an individual packet may be transmitted in a plurality of different bursts wherein different frequencies may be used for respective ones of the portions of the packet in each burst to provide for frequency hopping across portions of the packet. However, it is further to be understood that frequency hopping from packet to packet of a communication stream of data being provided to the system 505 for transmission or being received by the system 505 from the transceiver 510 may also have packet by packet frequency hopping applied where appropriate. The modulator/demodulator 530, in combination with the transceiver 510, transmits the portions of the communication packet in their respective different transmission windows using frequency hopping across the associated number of transmission frequencies of the selected one of the candidate frequency hopping modes.

It is to be understood that the controller circuit 505 as described for FIG. 5 may be, for example, implemented in the controller 360 of the mobile terminal 300 illustrated in FIG. 3. Furthermore, the operations of the controller circuit 505 of FIG. 5 may also be implemented at various devices within the base station system illustrated in FIG. 4. For example, such operations may be supported by the controller 424 of the BTS, by the BSC 430 or the MSC/MTSO. Furthermore, such operations may, where appropriate, be distributed across various of the component controllers which may be included in different base station systems.

It is to be understood that methods and systems for selecting a frequency hopping mode according to the present invention may be utilized in a variety of communication devices, including wireless communication devices such as wireless mobile terminals. Such a mobile terminal may include a transmitter, a receiver, a user interface and an antenna system as illustrated in FIG. 3. By way of background, the transmitter typically converts the information which is to be transmitted by the mobile terminal into an electromagnetic signal suitable for radio communications. The receiver demodulates electromagnetic signals which are received by the mobile terminal so as to provide the information contained in the signals to the user interface in a format which is understandable to the user. The receiver generally includes an RF processor and a baseband processor. A wide variety of transmitters, receivers, and user interfaces (e.g., microphones, keypads, displays) which are suitable for use with handheld radiotelephones are known to those of skill in the art, and such devices may be implemented in a radiotelephone including selective frequency hopping in accordance with the present invention. Other than the selective frequency hopping of the present invention, the design of such a radiotelephone is well known to those of skill in the art and will not be further described herein. It is further to be understood that the present invention is not limited to radiotelephones and may also be utilized with other wireless and wired communication receivers.

The present invention is generally described herein in the context of a wireless terminal or mobile terminal. As used herein, the term "wireless terminal" or "mobile terminal" may include, but is not limited to, a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Wireless terminals may also be referred to as "pervasive computing" devices and may be mobile terminals.

As described above, the present invention provides for selective implementation of frequency hopping in multiple transmission scheme communication systems based on the selected transmission scheme for a communication. Analysis and simulation of the various modes indicates that frequency hopping is typically beneficial when the coding rate does not exceed a certain threshold. Beyond that threshold, the high rate code may not be powerful enough to exploit diversity. In fact, frequency hopping may become detrimental by leading to an increase in FER.

In the EDGE standard, for example, the highest payload modes (transmission schemes) are generally also those with the highest coding rates, so their performance may be degraded by frequency hopping. For instance, suppose that 6 low payload modes work better with frequency hopping, while 2 high payload modes work better without frequency hopping. Studies have indicated that, on average, when one factors in the demand of many users in different conditions and operating at different modes, an EDGE system without frequency hopping performs better than one with frequency hopping. This is likely due to the fact that the high payload modes tend to dominate the overall performance of the system.

It is to be understood that the present invention generally relates to selective frequency hopping across bursts (or other transmission windows) used for a packet. It may be desirable to apply frequency hopping on a packet by packet basis, to provide some immunity against persistent fades, even if a no frequency hopping mode is selected across bursts of a packet. Such packet-by-packet frequency hopping may not help or hurt individual packets, but it may reduce the likelihood of long runs of failed packets, which may trigger a dropped connection. In general, frequency hopping on a packet by packet basis can help randomize both the fading scenario and the interference scenario as seen by a user.

In accordance with the present invention, it is also desirable to determine an appropriate matching of a level of frequency hopping for the particular transmission schemes (modes) supported by a communication system. Thus, for the example described above, there may be 2 "bad" modes and 6 "good" modes if frequency hopping is enabled for a system whereas, without frequency hopping, 6 "bad" modes and 2 "good" modes may be provided. When viewed in this light, neither choice looks desirable. The present invention may apply a desired frequency hopping for each mode by applying frequency hopping selectively and, in various embodiments, in a particular amount when frequency hopping is enabled which provides a desired cost/benefit balance.

Theoretical studies, as described in R. Knopp and P. Humblet, "On Coding for Block Fading Channels," *IEEE Trans. Inform. Theory*, Vol. 46, No. 1, 2000, have indicated that, given a diversity order, there is an upper bound to the rate of a code that can exploit this available diversity. Simulation studies by the present inventors have shown that, for a given code, the benefit of hopping generally depends on the number of hops and on the SNR. Consider a simple example of 2 cases:

A. Coding rate of R or less;
B. Coding rate greater than R

Where, for example, R may be ½. For Case A, increasing the number of hops generally improves performance. The improvement is, essentially, a change in slope in the FER versus SNR curve. As the number of hops increases, the slope becomes steeper, indicating that the decoder is achieving diversity gain. There is generally a saturation point $L_{max}$, beyond which increasing the number of hops further does not help much.

For Case B, increasing the number of hops may help or hurt, depending on the number of hops and the SNR. At low SNR, it is generally better not to hop, and, at high SNR, there is typically a minimum number $L_{min}$ of hops required to cause an improvement. Beyond that number, performance will typically keep getting better until a saturation point is reached, as before.

By treating Case A and Case B differently, and selectively using packet hopping, various embodiments of the present invention may accommodate a plurality of modes within a communication system while substantially keeping the randomization benefit of frequency hopping.

For example, a convolutional code with memory 5 coupled with binary modulation yields a threshold R=½. The specific value of the threshold, and whether there are more than two rate regions and more than two SNR regions depends on the specific system and the channel conditions. The system details may include the coding, interleaving and modulation, and the channel details may include the carrier frequency, the signal bandwidth, the time dispersion, etc. Thus, a selection criterion may be provided for selecting one of a plurality of candidate frequency hopping modes as the frequency hopping mode for a communication. The selection criterion may be based on an associated coding rate for the transmission scheme used for the communication as well as consideration of the SNR environment and/or other system details. For example, in various embodiments, the selection criterion may define two regions based on a threshold level. In a first region, frequency hopping across bursts of a packet may not be used. In a second region, such as below a threshold defined by a coding rate, a plurality of frequencies may be selected to support frequency hopping across bursts of a packet. Furthermore, the selection criterion may specify more than two operating zones. For example, one condition may use no frequency hopping, another condition may provide two frequencies and a third condition may provide for more than two frequencies, and so on. The regions may be defined by a plurality of conditions, such as based on both the coding rate and the SNR.

Operations for selecting a frequency hopping mode according to embodiments of the present invention will now be generally described with reference to the flowchart illustration of FIG. 6. As shown in the embodiments illustrated in the flowchart diagram of FIG. 6, operations begin at block 600 with determining one of the plurality of transmission schemes available to a communication system to be used for a communication. As used herein, the term "a communication" generally refers to the communicated information content which may, for example, be voice or data. By way of example of determining the transmission scheme, on a transmit operation, a coding rate and modulation scheme may be determined for use in coding and modulating the communication before transmission over a channel of the communication system. Similarly, on a receive operation, the modulation scheme and coding rate for a received signal may be determined to allow demodulation and decoding of the received signal to proceed.

One of a plurality of candidate frequency hopping modes is selected as the frequency hopping mode for the communication based on the determined transmission scheme for the communication (block 610). For example, in a transmitter operation, one or more frequencies may be associated with transmissions of respective portions of a communication packet. Thus, use of a single transmission frequency candidate frequency hopping mode would provide no frequency hopping across portions of a packet during transmission. Further candidate frequency hopping modes may include numbers of transmission frequencies which provide for a different transmission frequency for each of the portions of a packet or for a lesser number of frequency changes than there are portions of the packet.

Figure 6:
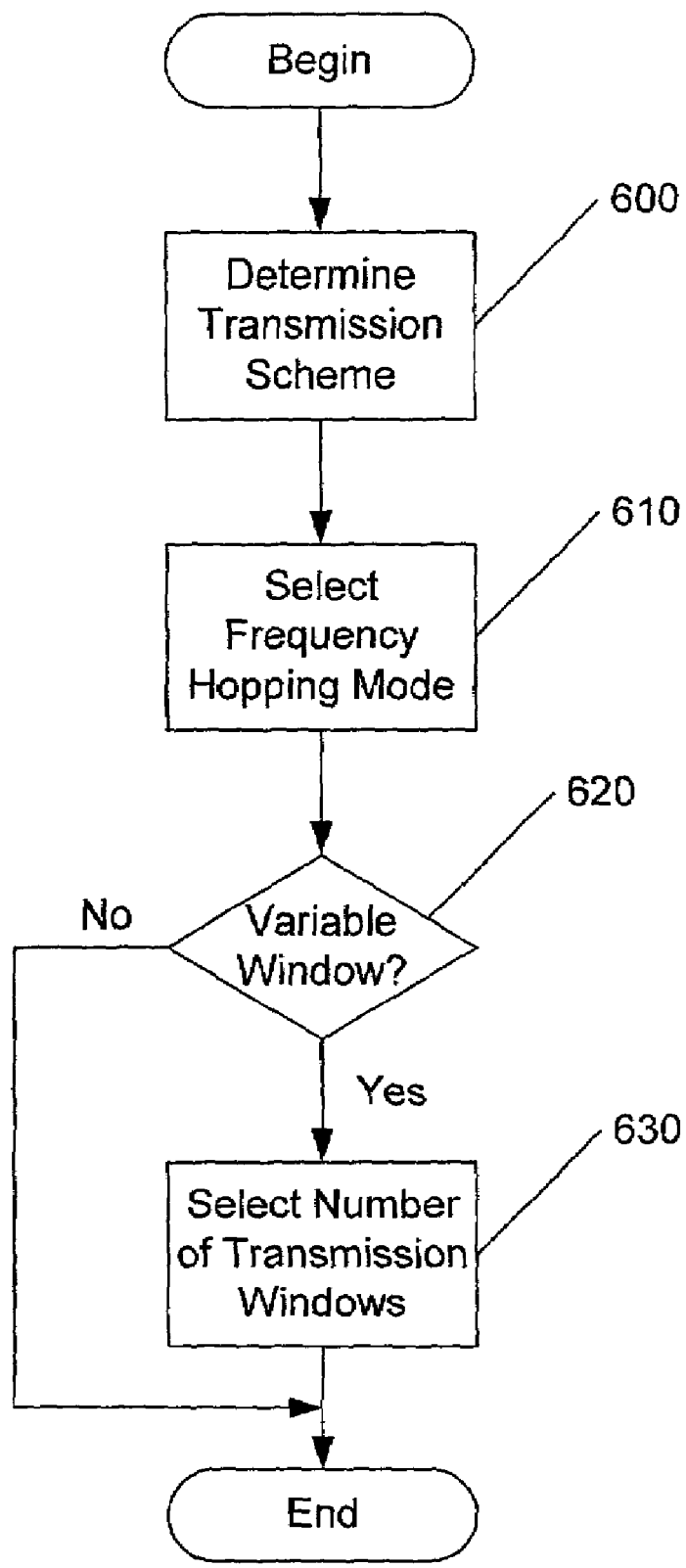
FIG. 6 is a flowchart illustrating operations for selecting a frequency hopping mode for a communication in a communication system having a plurality of transmission schemes according to embodiments of the present invention.

As further shown in FIG. 6, in various embodiments of the present invention, the number of bursts used to transmit a packet may be variable. For example, if it is determined that only two different transmission frequencies are desired for frequency hopping, the packet may be segmented into only two portions transmitted in separate communication bursts. Thus, in embodiments where a variable window is desired (block 620), a number of transmission windows (or bursts) to be used for transmission of the packet is selected (block 630).

It is to be understood that the transmission schemes determined at block 600 may be determined dynamically based on a characteristic of the communication and/or a characteristic of the channel over which the communication is to be communicated. For example, the signal to noise characteristics of the channel may influence the desirability of use of frequency hopping and the amount of hops to be utilized in transmitting a packet. Furthermore, different types of communications may require greater or lesser protection. This may allow the use of lower or higher data rate transmission schemes, such as may be provided by the selection of the modulation scheme used for communication or the coding rate applied before modulation. Thus, each of the transmission schemes may have an associated coding rate and modulation scheme.

In addition, operations related to selecting a frequency hopping mode at block 610, various embodiments of the present invention include selecting whether frequency hopping is applied or not. For example, when the transmission scheme for the communication has an associated coding rate that falls with a first region of a selection criterion (such as above or below a threshold level), a frequency hopping mode having a common frequency as a transmission frequency for the packet in each of the transmission windows may be selected so as to provide no frequency hopping. When the associated coding rate is in a different region of the selection criterion, a candidate frequency hopping mode providing at least two different frequencies for the packet may then be selected.

In further embodiments, in addition to determining whether frequency hopping should be enabled or not, the present invention may provide for selection of the amount of frequency hopping that is desirable when frequency hopping is enabled. Thus, one of the candidate frequency hopping modes having a desired number of associated frequencies over which the packet is distributed may be selected based on the determined transmission scheme and the signal quality of the channel. Furthermore, one of the candidate frequency hopping modes with the highest number of associated frequencies which does not exceed an upper bound number of frequencies for the determined transmission scheme may be selected. Thus, the communication system may provide a fixed number of options for transmission schemes and each of these may have an associated upper bound number of frequencies that is selected so as to provide the greatest benefit reasonably obtainable from frequency hopping without unnecessarily requiring more changes of transmission frequency than necessary given the potentially diminished returns of frequency hopping above a certain saturation level number of hops.

Note that in FIG. 6, whereas determining the transmission scheme 600 and selecting the frequency hopping mode 610 are shown separately, these operations may be performed jointly.

Figure 7:
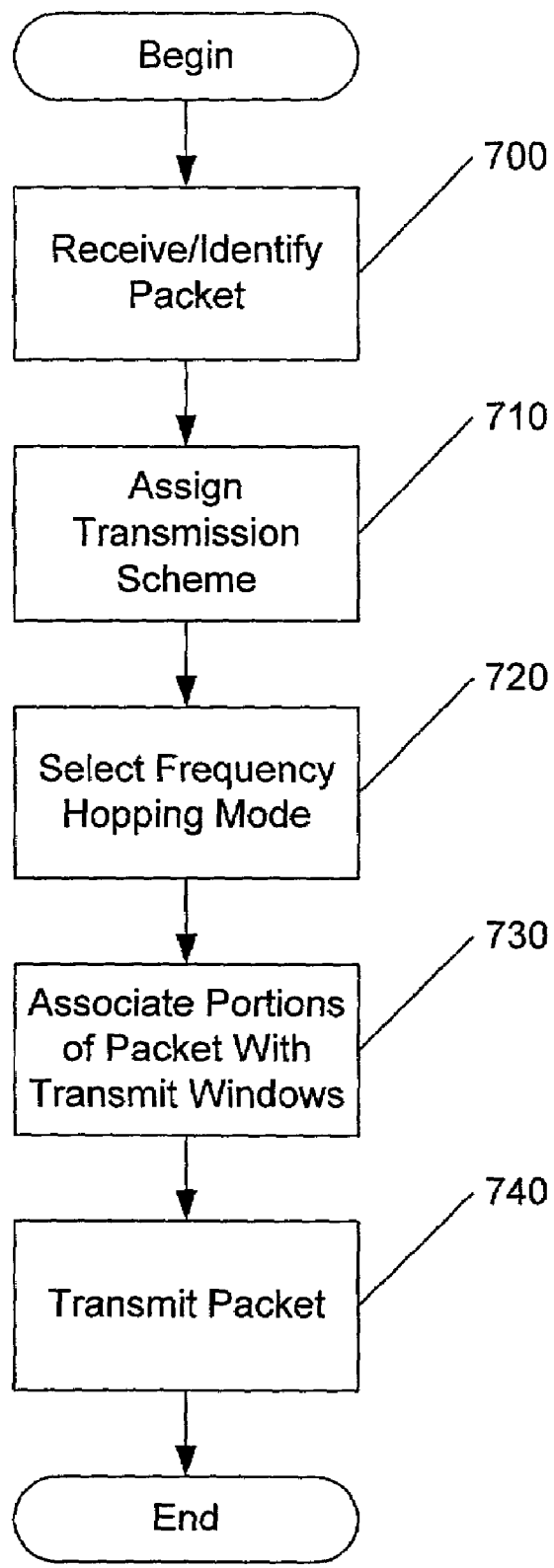
FIG. 7 is a flowchart illustrating operations for transmitting a communication packet in a communication system having a plurality of transmission schemes according to embodiments of the present invention.

Operations for transmitting a communication packet in a communication system having a plurality of transmissions schemes according to various embodiments of the present invention will now be further described with reference to the flowchart diagram illustration of FIG. 7. As shown in FIG. 7, operations begin at block 700 with receipt of a communication packet for transmission over the communication system. Please note that, while as described herein, operations are described with reference to transmission in accordance with the present invention, those of ordinary skill in the art will understand the corresponding operations associated with receiving such transmissions at a receiver.

One of the available transmission schemes of the communication system is assigned to the communication packet (block 710). As described previously, the assigned transmission scheme may have an associated coding rate and/or modulation scheme. One of a plurality of candidate frequency hopping modes is selected as the frequency hopping mode for the communication packet based on the assigned transmission scheme (block 720). Each of the candidate frequency hopping modes has an associated number of transmission frequencies for use in frequency hopping. Thus, one of the candidate frequency hopping modes may have one as an associated number to provide no frequency hopping. It is further to be understood that the frequency hopping modes may be stored and retrieved as a number of frequencies or may instead be provided with designations of frequencies for use in frequency hopping where the number of associated stored transmission frequencies corresponds to the number of transmission frequencies to be used in frequency hopping and no frequency hopping may be provided by having a single transmission frequency designated for use in transmitting the packet across all transmission windows (bursts) used for the transmission.

Portions of the communication packet are associated with different transmission windows (bursts) of a channel of the communication system (block 730). The portions of the communication packet are transmitted in their respective transmission windows using frequency hopping across the number of transmission frequencies provided by the selected candidate frequency hopping mode (block 740). It is to be understood that the transmission further complies with the modulation scheme and/or coding rate specified by the assigned transmission scheme from block 710. It is further to be understood that both selection of the transmission scheme at block 710 and the frequency hopping mode at block 720 may further be based on a characteristic of the channel used for the communication, such as a signal quality of the channel. Furthermore, it is to be understood that transmission operations as described for further embodiments of the present invention in FIG. 7 may also include operations related to selection of the number of transmission windows as described for alternative embodiments illustrated in FIG. 6.

While only a transmission of a single packet is described with reference to FIG. 7, it is to be understood that additional communication packets may be received for which frequency hopping across portions of the packet and respective transmission windows may be provided as described previously. Furthermore, packet to packet frequency hopping may be provided across ones of communication packets. The resulting transmitted packets may be received at a receive device to recreate the communication packets.

The present invention will now be further described with reference to particular examples of selective frequency hopping including more specific details about exemplary hopping patterns for different modes. Suppose for simplicity in this example that, for all modes, each packet is interleaved over L bursts. A hopping pattern:

$$(f_1, f_2, f_3 \ldots, f_N) \quad (1)$$

is assigned to a user, where each element $f_i$ indicates a frequency. It is assumed that the pattern repeats after N hops, where N is usually much greater than L.

Suppose the user is to transmit a number of packets on a low rate mode, which belongs to Case A. Then the first packet is transmitted on:

$$(f_1, f_2, \ldots, f_L) \quad (2)$$

the second packet is transmitted over:

$$(f_{L+1}, f_{L+2}, \ldots, f_{2L}), \quad (3)$$

and so on.

Now further suppose the user is to transmit a number of packets on a high rate mode, which belongs to Case B. If, for that rate, $L_{min} \geq L$, or if the SNR is too low for that rate, then the packets are not frequency hopped burst by burst (i.e., only a single common transmission frequency is used), although packet by packet frequency hopping may still be utilized. Then the first packet is transmitted on:

$$(f_1, f_1 \ldots, f_1) \quad (4)$$

the second packet is transmitted over:

$$(f_2, f_2, \ldots, f_2), \quad (5)$$

and so on. On the other hand, if the value $L_{min} \leq L$, and the SNR is high enough, the user proceeds as in case A.

Further embodiments of the present invention may also facilitate current saving in the systems implementing the present invention. For example, where interleaving is used, if the interleaving length L is large enough, it is possible for L to be significantly larger than $L_{max}$, for certain rates. For example, L may be equal to 16, whereas $L_{max}$ is 4 or 8. When that is the case, it may be desirable to limit the number of hops per packet to $L_{max}$ in order to reduce the number of frequency switches in the synthesizers at the transmitter and the receiver, which may reduce current consumption.

By way of example, suppose the user is to transmit a number of packets on a low rate mode, which belongs to Case A. Also, to simplify the description, suppose that $L=2L_{max}$ for that mode. Then the first packet is transmitted on:

$$(f_1, f_1, f_2, f_2, \ldots, f_{L/2}, f_{L/2}) \quad (6)$$

and so on. If $L=2L_{max}+1$, then the first packet can be transmitted on:

$$(f_1, f_1, f_1, f_2, f_2 \ldots, f_{L/2}, f_{L/2}) \quad (7)$$

and so on, so that $L_{max}$ hops are provided per packet. This can be extended to the general case of $L=IL_{max}+J$, where J is less than $L_{max}$.

For a high rate mode with a high enough SNR, the same technique can be used at high SNR. The case of high rate and low SNR may be used without frequency hopping across portions of a packet as described for the examples above.

As described with reference to block 630 of FIG. 6, systems may be provided in which the number of transmission windows over which a packet is transmitted are selectively varied. In other words, packets may be interleaved over a variable number of bursts, where the number of bursts may be set equal to $L_{max}$ for a given mode. Because burst payloads are typically fixed, the variable number of bursts approach of various embodiments of the present invention may utilize packets having a variable payload. Such an approach may beneficially reduce the delay associated with interleaving by providing the smallest number of bursts that produces most of the hopping diversity gain by setting the number of bursts equal to the number of transmission frequencies associated with a selected frequency hopping mode.

In order to accommodate the variable payload, the coding and interleaving functions should be adjusted accordingly. For example, for a fixed coding rate, the number of bits produced by the encoder should change in proportion with the variable number of input bits. Similarly, the interleaver should be dimensioned appropriately. The methods for adjusting such functions will be understood by those of skill in the art.

Operations of the present invention have been described with respect to the block diagram illustrations of FIGS. 3 through 5 and the flowchart illustrations of FIGS. 6 and 7. It will be understood that each block of the flowchart illustrations and the block diagram illustrations of FIGS. 3 through 7, and combinations of blocks in the flowchart illustrations and the block diagram illustrations, can be implemented by computer program instructions. These program instructions may be provided to a processor to produce a machine, such that the instructions which execute on the processor create means for implementing the acts specified in the flowchart and block diagram block or blocks. The computer program instructions may be executed by a processor to cause a series of operational steps to be performed by the processor to produce a computer implemented process such that the instructions which execute on the processor provide steps for implementing the operations specified in the flowchart and block diagram block or blocks.

Accordingly, blocks of the flowchart illustrations and the block diagrams support combinations of means for performing the specified acts, combinations of steps for performing the specified acts and program instruction means for performing the specified acts. It will also be understood that each block of the flowchart illustrations and block diagrams, and combinations of blocks in the flowchart illustrations and block diagrams, can be implemented by special purpose hardware-based systems which perform the specified operations or steps, or by combinations of special purpose hardware and computer instructions. For example the transmission scheme selection circuit 515, frequency hopping mode selection circuit 520 and packet segmentation circuit 525 may all be implemented as code executing on a processor, as integrated circuit devices, such as signal processors or custom chips, or as a combination of the above.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method for selecting a frequency hopping mode for a communication in a communication system having a plurality of transmission schemes, the method comprising:
selecting one of a plurality of candidate frequency hopping modes as the frequency hopping mode for the communication in the communication system based on a transmission scheme of the plurality of transmission schemes selected for the communication in the communication system, wherein selecting one of the plurality of transmission schemes to be used for the communication in the communication system comprises dynamically selecting one of the plurality of transmission schemes to be used for the communication based on at least one of a characteristic of the communication in the communication system and a characteristic of a channel of the communication system over which the communication is to be communicated;
wherein each of the transmission schemes has at least one of an associated coding rate and modulation scheme; and
wherein the communication comprises a packet distributed over a plurality of transmission windows and wherein ones of the plurality of candidate frequency hopping modes define a transmission frequency for the packet in corresponding ones of the transmission windows.

2. The method of claim 1 wherein selecting one of a plurality of candidate frequency hopping modes as the frequency hopping mode for the communication in the communication system based on the selected transmission scheme for the communication further comprises selecting one of a plurality of candidate frequency hopping modes providing a common frequency as the transmission frequency for the packet in each of the plurality of transmission windows when the selected transmission scheme for the communication in the communication system has an associated coding rate that falls within a first region of a selection criterion and selecting one of the plurality of candidate frequency hopping modes providing at least two different frequencies for the packet when the selected transmission scheme for the communication has an associated coding rate that falls within a second region of the selection criterion.

3. The method of claim 2 wherein the selection criterion defines at least three regions and wherein selecting one of a plurality of candidate frequency hopping modes as the frequency hopping mode for the communication in the communication system based on the selected transmission scheme for the communication further comprises selecting a first one of the plurality of candidate frequency hopping modes providing a common frequency as the transmission frequency for the packet in each of the plurality of transmission windows when the selected transmission scheme for the communication in the communication system has an associated coding rate that falls within a first region of the selection criterion, selecting a second one of the plurality of candidate frequency hopping modes providing at least two different frequencies for the packet when the selected transmission scheme for the communication in the communication system has an associated coding rate that falls within a second region of the selection criterion and selecting a third one of the plurality of candidate frequency hopping modes providing a number of different frequencies for the packet which differs from the first me and the second one of the plurality of candidate frequency hopping modes when the selected transmission scheme far the communication in the communication system has an associated coding rate that falls within a third region of the selection criterion.

4. The method of claim 1 wherein ones of the plurality of candidate frequency hopping modes have different numbers of associated frequencies over which the packet is transmitted and wherein selecting one of a plurality of candidate frequency hopping modes as the frequency hopping mode for the communication in the communication system based on the selected transmission scheme for the communication further comprises:
determining a desired number of associated frequencies over which the packet is to be distributed based on the selected transmission scheme and a signal quality of the channel; and
selecting one of the plurality of candidate frequency hopping modes having the desired number of associated frequencies.

5. The method of claim 4 wherein selecting one of the plurality of candidate frequency hopping modes having the desired number of associated frequencies further comprises selecting one of the plurality of candidate frequency hopping modes with highest number of associated frequencies which does not exceed an upper bound number of frequencies for the selected transmission scheme.

6. The method of claim 5 further comprising selecting the number of transmission windows to equal the number of associated frequencies of the selected one of the plurality of candidate frequency hopping modes.

7. The method of claim 4 wherein the communication in the communication system comprises a plurality of packets and further comprising applying packet by packet frequency hopping across the plurality of packets.

8. The method of claim 4 wherein the communication system comprises an Enhanced Data Rates for Global Evolution (EDGE) system.

9. A method for transmitting a communication packet in a communication system having a plurality of transmission schemes, the method comprising:
  receiving the communication packet for transmission over the communication system;
  assigning one of the plurality of transmission schemes to the communication packet, the assigned transmission scheme having an associated coding rate and modulation scheme;
  selecting one of a plurality of candidate frequency hopping modes as a frequency hopping mode for the communication packet based on the assigned transmission scheme each of the plurality of candidate frequency hopping modes having an associated number of transmission frequencies wherein one of the candidate frequency hopping modes has one as the associated number of transmission frequencies to provide no frequency hopping;
  associating portions of the communication packet with different transmission windows of a channel of the communication system; and
  transmitting the portions of the communication packet in their respective associated different transmission windows using frequency hopping across the associated number of transmission frequencies of the selected one of the plurality of candidate frequency hopping modes.

10. The method of claim 9 wherein selecting one of a plurality of candidate frequency hopping modes as the frequency hopping mode for the communication packet further comprises selecting one of the plurality of candidate frequency hopping modes as the frequency hopping mode for the communication based on the assigned transmission scheme and a characteristic of the channel.

11. The method of claim 10 wherein selecting me of a plurality of candidate frequency hopping modes as the frequency hopping mode for the communication further comprises selecting the one of a plurality of candidate frequency hopping modes providing no frequency hopping as the frequency hopping mode for the communication when the assigned transmission scheme for the communication has an associated coding rate that falls within a first region of a selection criterion and selecting one of the plurality of candidate frequency hopping modes providing at least two different transmission frequencies for use in frequency hopping for the packet when the assigned transmission scheme for the communication has an associated coding rate that falls within a second region of the selection criterion.

12. The method of claim 10 wherein the characteristic of the channel comprises a signal quality of the channel.

13. The method of claim 12 wherein selecting one of a plurality of candidate frequency hopping modes as the frequency hopping mode for the communication further comprises selecting one of the plurality of candidate frequency hopping modes with the highest number of associated transmission frequencies which does not exceed an upper bound number of frequencies for the assigned transmission scheme.

14. The method of claim 13 wherein associating portions of the communication packet with different transmission windows of a channel of the communication system further comprises selecting the number of transmission windows to equal the number of associated transmission frequencies of the selected one of the plurality of candidate frequency hopping modes.

15. The method of claim 9 further comprising receiving additional communication packets and transmitting the communication packet and the additional communication packets using packet by packet frequency hopping across the communication packets.

16. The method of claim 9 further comprising receiving the transmitted portions of the communication packet at a receiver device to recreate the communication packet.

17. The method of claim 9 wherein the communication system comprises an Enhanced Data Rates for Global Evolution (EDGE) system.

18. A system for selecting a frequency hopping mode for a communication in a communication system having a plurality of transmission schemes, the system comprising:
  a transmission scheme selection circuit that determines one of the plurality of transmission schemes to be used for the communication; and
  a frequency hopping mode selection circuit that selects one of a plurality of candidate frequency hopping modes as the frequency hopping mode fox the communication based on the determined transmission scheme for the communication, wherein the transmission scheme selection circuit is configured to dynamically select one of the plurality of transmission schemes to be used for the communication based on at least one of a characteristic of the communication and a characteristic of a channel over which the communication is to be communicated;
  wherein each of the transmission schemes has at least one of an associated coding rate and modulation scheme; and
  wherein the communication comprises a packet distributed over a plurality of transmission windows and wherein ones of the plurality of candidate frequency hopping modes define a transmission frequency for the packet in corresponding ones of the transmission windows.

19. The system of claim 18 wherein the system comprises a mobile terminal.

20. The system of claim 18 wherein the system comprises a base station.

21. The system of claim 18 wherein the frequency hopping mode selection circuit is configured to select one of the plurality of candidate frequency hopping modes providing a common frequency as the transmission frequency for the packet in each of the plurality of transmission windows when the determined transmission scheme for the communication has an associated coding rate that falls within a first region of a selection criterion and to select one of the plurality of candidate frequency hopping modes providing at least two different frequencies for the packet when the determined transmission scheme for the communication has an associated coding rate that falls within a second region of the selection criterion.

22. The system of claim 21 wherein the selection criterion defines at least three regions and wherein the frequency hopping mode selection circuit is configured to select a first one of plurality of candidate frequency hopping modes providing a common frequency as the transmission frequency for the packet in each of the plurality of transmission windows when the determined transmission scheme for the communication has an associated coding rate that falls within a fist region of the selection criterion, to select a second one of the plurality of candidate frequency hopping modes providing at least two different frequencies for the packet when the determined transmission scheme for the communication has an associated coding rate that falls within a second region of the selection criterion and to select a third one of the plurality of candidate frequency hopping modes providing a number of different frequencies for the packet which differs from the first one and the second one of the plurality of candidate frequency hopping modes when the determined transmission scheme far the communication has an associated coding rate that falls within a third region of the selection criterion.

23. The system of claim 18 wherein ones of the plurality of candidate frequency hopping modes have different numbers of associated frequencies over which the packet is transmitted and wherein the frequency happing mode selection circuit further comprises:
  means for determining a desired number of associated frequencies over which the packet is to be distributed based on the determined transmission scheme and a signal quality of the channel; and
  means for selecting one of the plurality of candidate frequency hopping modes having the desired number of associated frequencies.

24. The system of claim 23 wherein the frequency hopping mode selection circuit is further configured to select one of the plurality of candidate frequency hopping modes with the highest number of associated frequencies which does not exceed an upper bound number of frequencies for the determined transmission scheme.

25. The system of claim 24 further comprising a transmission window selection circuit that selects the number of transmission windows to equal the number of associated frequencies of the selected one of the plurality of candidate frequency hopping modes.

26. The system of claim 23 wherein the communication comprises a plurality of packets and further comprising a packet frequency hopping circuit that applies packet by packet frequency hopping across the plurality of packets.

27. The system of claim 23 wherein the communication system comprises an Enhanced Data Rates for Global Evolution (EDGE) system.

28. A system for transmitting a communication packet in a communication system having a plurality of transmission schemes, the system comprising:
  a transmission scheme selection circuit that assigns one of the plurality of transmission schemes to the communication packet, the assigned transmission scheme having an associated coding rate and modulation scheme;
  a frequency hopping mode selection circuit that selects one of a plurality of candidate frequency hopping modes as a frequency hopping mode for the communication packet based on the assigned transmission scheme, each of the plurality of candidate frequency hopping modes having an associated number of transmission frequencies wherein one of the candidate frequency hopping modes has one as the associated number of transmission frequencies to provide no frequency hopping;
  a packet segmentation circuit that associates portions of the communication packet with different transmission windows of a channel of the communication system; and
  a transmitter that transmits the portions of the communication packet in their respective different transmission windows using frequency hopping across the associated number of transmission frequencies of the selected me of the plurality of candidate frequency hopping modes.

29. The system of claim 28 wherein the system comprises a mobile terminal.

30. The system of claim 28 wherein the system comprises a base station.

31. The system of claim 28 wherein the frequency hopping mode selection circuit is further configured to select one of the plurality of candidate frequency hopping modes as the frequency hopping made for the communication packet based on the assigned transmission scheme and a characteristic of the channel.

32. The system of claim 31 wherein the frequency hopping mode selection circuit is further configured to select the one of the plurality of candidate frequency hopping modes providing no frequency hopping as the frequency hopping mode for the communication packet when the assigned transmission scheme for the communication packet has an associated coding rate that falls within a first region of a selection criterion and to select one of the plurality of candidate frequency hopping modes providing at least two different transmission frequencies for use in frequency hopping for the communication packet when the assigned transmission scheme for the communication packet has an associated coding rate that falls within a second region of the selection criterion.

33. The system of claim 31 wherein the characteristic of the channel comprises a signal quality of the channel.

34. The system of claim 33 wherein the frequency hopping mode selection circuit is further configured to select one of the plurality of candidate frequency hopping modes with the highest number of associated transmission frequencies which does not exceed an upper bound number of frequencies for the assigned transmission scheme.

35. The system of claim 34 wherein the packet segmentation circuit is further configured to select the number of transmission windows to equal the number of associated transmission frequencies of the selected one of the plurality of candidate frequency hopping modes.

36. The system of claim 28 further comprising means for receiving additional communication packets and transmitting the communication packet and the additional communication packets using packet by packet frequency hopping across the communication packets.

37. The system of claim 28 wherein the communication system comprises an Enhanced Data Rates for Global Evolution (EDGE) system.

38. A system for transmitting a communication packet in a communication system having a plurality of transmission schemes, the system comprising:
  means for receiving the communication packet for transmission over the communication system;
  means for assigning one of the plurality of transmission schemes to the communication packet, the assigned transmission scheme having an associated coding rate and modulation scheme;
  means for selecting one of a plurality of candidate frequency hopping modes as the frequency hopping mode for the communication packet based on the assigned transmission scheme, each of the plurality of candidate frequency hopping modes having an associated number of transmission frequencies wherein one of the candidate frequency hopping modes has one as the associated number of transmission frequencies to provide no frequency hopping;
  means for associating portions of the communication packet with different transmission windows of a channel of the communication system; and
  means for transmitting the portions of the communication packet in their respective associated different transmission windows using frequency hopping across the associated number of transmission frequencies of the selected one of the plurality of candidate frequency hopping modes.

* * * * *

UNITED STATES PATENT AND TRADEMARK OFFICE
CERTIFICATE OF CORRECTION

PATENT NO. : 7,142,581 B2
APPLICATION NO. : 09/800143
DATED : November 28, 2006
INVENTOR(S) : Khayrallah et al.

Page 1 of 1

It is certified that error appears in the above-identified patent and that said Letters Patent is hereby corrected as shown below:

In Column 12, Line 32, in Claim 3, delete "me" and insert -- one --, therefor.

In Column 12, Line 33, in Claim 3, delete "far" and insert -- for--, therefor.

In Column 12, Line 54, in Claim 5, after "with" insert -- the --.

In Column 13, Line 13, in Claim 9, after "scheme" insert -- , --.

In Column 13, Line 33, in Claim 11, delete "me" and insert -- one --, therefor.

In Column 14, Line 16, in Claim 18, delete "fox" and insert -- for --, therefor.

In Column 14, Line 54, in Claim 22, after "one of" insert -- the --.

In Column 14, Line 58, in Claim 22, delete "fist" and insert -- first --, therefor.

In Column 15, Line 1, in Claim 22, delete "far" and insert -- for --, therefor.

In Column 15, Line 7, in Claim 23, delete "happing" and insert -- hopping --, therefor.

In Column 15, Line 58, in Claim 28, delete "me" and insert -- one --, therefor.

In Column 16, Line 1, in Claim 31, delete "made" and insert -- mode --, therefor.

Signed and Sealed this

Eighteenth Day of December, 2007

JON W. DUDAS
*Director of the United States Patent and Trademark Office*